United States Patent [19]
Croisier
[11] 3,825,737
[45] July 23, 1974

[54] DIGITAL PHASE DETECTOR

[75] Inventor: Alain Croisier, Cagnes, France
[73] Assignee: International Business Machines Corporation, Armonk, N.Y.

[22] Filed: Dec. 11, 1972
[21] Appl. No.: 313,893

[30] Foreign Application Priority Data
Dec. 21, 1971 France 7147850

[52] U.S. Cl. 235/186, 235/152
[51] Int. Cl. G06f 15/34
[58] Field of Search 235/186, 197, 152; 328/72, 328/63, 166, 167, 133, 155; 329/104, 129; 325/320; 178/68

[56] References Cited
UNITED STATES PATENTS

| | | | |
|---|---|---|---|
| 3,588,710 | 6/1971 | Masters | 328/133 |
| 3,624,520 | 11/1971 | Perkins et al. | 178/68 X |
| 3,656,064 | 4/1972 | Giles | 325/320 X |
| 3,683,162 | 8/1972 | Jacob et al. | 235/156 |

*Primary Examiner*—Joseph F. Ruggiero
*Attorney, Agent, or Firm*—John B. Frisone

[57] ABSTRACT

A detector in which the phase $\theta$ of an applied sinusoid $S = R \text{ Sin } \theta$ is digitally obtained by determining the unit circle equivalent of the quadrant of the phase angle from the sign match or mismatch between the sinusoid S and its quadrature $\bar{S} = R \text{ Cos } \theta$ and by determining the unit circle equivalent of an acute reference angle $\alpha$ derived according to the relation $\alpha = \tan^{-1} e^{\ln|S| - \ln|\bar{S}|}$. The signal and its quadrature are periodically sampled and digitally sign and magnitude encoded. The digital magnitudes $|S|$ and $|\bar{S}|$ are applied to table look-up devices to obtain $\ln|S|$ and $\ln|\bar{S}|$ respectively. A digital subtractor forms $\ln|S| - \ln|\bar{S}|$, which difference is then applied to a table look-up device to obtain $\alpha$. A logic element responsive to the encoded signs and the derived reference angle $\alpha$ generates the coded equivalent to $\theta$.

4 Claims, 11 Drawing Figures

DIGITAL PHASE DETECTOR

BACKGROUND OF THE INVENTION

This invention relates to the detection of the phase of a periodic signal and, more particularly, to a digital phase detector.

In an operation which recurs periodically, phase is the fraction of the period which has elapsed as measured from some reference. Sinusoidal signals, when angle modulated, depend upon acute phase detection at a receiver in order to extract information originally encoded (modulated) thereon at a transmitter. In those data transmission systems which rely upon the phase modulation technique, the data to be tranmitted are used to modulate the phase of a signal. A predetermined value of the phase of the signal corresponds to a predetermined value of the data to be transmitted. The number of distinct phases the signal can possibly have is equal to the number of distinct values the data can assume.

In the prior art phase detectors, detection of the phase of a sinusoidal signal is achieved by detecting the zero amplitude crossings of the received signal and by determining the phase of the received signal on the basis of the instants of time at which the zero crossings occur. This determination is generally performed either by measuring the elapsed time between a zero amplitude crossing of a sinusoid and a fixed phase reference, or between two successive zero amplitude crossings, depending upon whether a coherent phase modulation technique or a differential phase modulation technique is used. The measured times are subsequently decoded in terms of phase. A description of such systems is provided in the book entitled, "Data Transmission" by W. R. Bennett and J. R. Davey, published by McGraw Hill Book Co., New York, 1965, at pages 203–208.

As the number of phase shifted channels of a multiphase modulated system increase, the permissible phase variation per channel decreases. Thus, for $N=8$ then $\Delta\phi = 360/N = \pm 22.5°$, while for $N=16$, $\Delta\phi = \pm 11.25°$. This means that on the basis of zero amplitude crossing detection, the margin of difference becomes less between a phase shift due to information modulation and that due to noise or distortion. One technique known to the art for a multiphase system is to encode half the number of channels on each of two carriers in quadrature. However, the difficulty in discrimination between information and noise induced phase shift arises again whenever the number of channels is increased. This is in addition to the number of carriers and their attendent circuitry.

Although zero amplitude or axis crossing detection has found extensive use in frequency and phase shift keyed communications systems, one alternative may be found in Giles et al., U.S. Pat. No. 3,656,064, "Data Demodulator Employing Comparison", filed on Sept. 17, 1969 and issued on Apr. 11, 1972. In this reference, digital demodulation of a received signal is achieved by comparing the incoming signal with a delayed version of itself. In a two tone FSK system, when a signal is compared with a delayed version of itself in time, then a change in tone frequency can be detected. As pointed out by Giles at Column 3, lines 35–60, that in order to detect changes in tone of the modulated signal, the delay T must be such that a suitable decision or threshold margin be provided between the high and low frequency tones. He reports that the maximum threshold margin occurs when the delay T is equal to three-fourths of the period of the mean frequency of the high and low tones. The digital comparison is performed by a modulo two network and a digital filter for providing an indication of the modulation information as a function of the identity of a non-identity of the compared signals.

Central to the signal processing of Giles and other digital phase detectors (see F. A. Perkins, U.S. Pat. No. 3,624,520, issued Nov. 30, 1971) is the employment of time dependent devices which further require high accuracy if used to discriminate among a large number of phases modulated onto the same carrier frequency.

SUMMARY OF THE INVENTION

Let us recall that phase was defined as the fraction $\theta$ of a period T that has elapsed as measured from a reference. If given that a signal has the period $\omega T = 2\pi$ radians and is of the form $S = R \text{ Sin } \theta$, wherein $R$ is the maximum amplitude and $\theta$ is a function of the phase to be extracted, then what information about the sign S can be used to define $\theta$? Consider, that the trignometric functions such as sine, cosine, tangent and their inverses may be defined in each of the quadrants of a unit circle. If one measures an angle $\theta$ from the 0° in the first quadrant, the angle can be specified as an acute angle $\alpha$ and its relation to 0 or $\pi$ radians, i.e., $\theta = f(0°, \pi, \alpha)$.

Suppose that an input signal $S = R \text{ Sin } \theta$ is compared with its quadrature signal $\bar{S} = R \text{ Cos } \theta$ by way of division, i.e., $S/\bar{S} = R \text{ Sin } \theta / R \text{ Cos } \theta = \tan \theta$, one could uniquely define the quadrant of the angle $\theta$ by the match or mismatch condition of the signs of S and $\bar{S}$ and the magnitude of the acute angle $\alpha$ by the $\tan^{-1} | S/\bar{S} |$. As may be apparent from the prior art, where signal comparison was used to detect phase change, then elaborate analog signal processing (or its first cousin digital filtering) was required. If a ratio comparison of a signal and its quadrature is to be inexpensively implemented, then an embodiment should avoid the use of digital multipliers and/or dividers as these are sources of major cost and complexity.

The invention is embodied in a detector which samples and digitally sign and magnitude encodes the samples of an input sinusoid $S = R \text{ Sin } \theta$ and its quadrature $\bar{S} = R \text{ Cos } \theta$. The digital encoded magnitudes $|S|$ and $|\bar{S}|$ are applied to table look-up devices to obtain the $\ln|S|$ and $\ln|\bar{S}|$ respectively stored in the locations addressed by the encoded magnitudes. A digital substractor forms the digitally encoded difference $\ln|S| - \ln|\bar{S}|$, which difference is in turn used to address a table look-up device to obtain the angle $\alpha$. The angle $\alpha$ is coded and stored according to the relation $\alpha = \tan^{-1} e^{\ln|S| - \ln|\bar{S}|}$. A logical element jointly responsive to the match or mismatch of the signs of S and $\bar{S}$ and the angle magnitude $\alpha$ generates a coded equivalent of $\theta$. Illustratively, if the sign of S is + and $\bar{S}$ is + then $\theta = \alpha$. However, if both S and $\bar{S}$ are − then $\theta = \pi + \alpha$.

DESCRIPTION OF THE PREFERRED EMBODIMENTS

Figure 1:
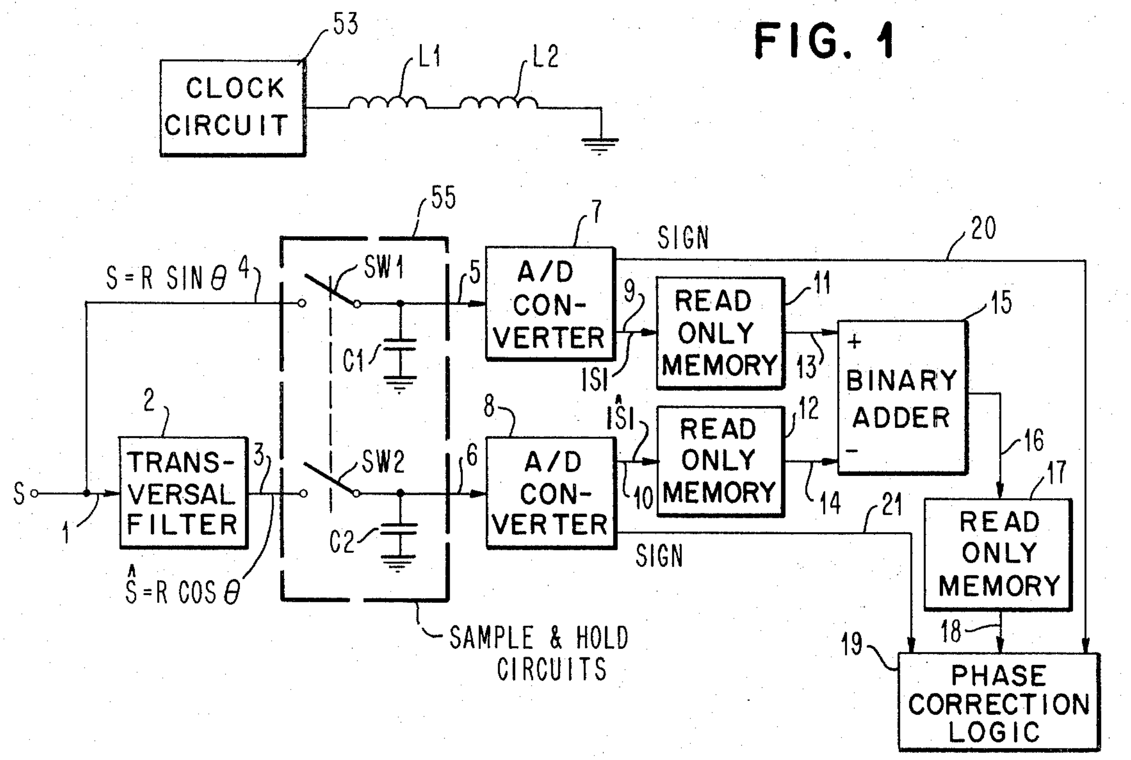
FIG. 1 is a schematic diagram illustrating an embodiment of a digital phase detector built in accordance with the principles of the present invention.

Referring now to FIG. 1, there is shown a digital phase detector in accordance with the present invention. An input signal S is applied via line 1 to a device 2. This device provides at its output on line 3 a signal in quadrature with the input signal. This quadrature signal may also be called the Hilbert transform $\bar{S}$ of the input signal. Such a device may, for example, consist of a transversal filter of the type described in U.S. Pat. No. 3,543,009, issued to H. B. Voelcker, Jr. on Nov. 24, 1970.

The input signal S, transmitted via line 4, and signal $\bar{S}$, transmitted via line 3, are respectively applied to two switches SW1, SW2, whose simultaneous closure is controlled by a clock circuit 53, coils L1 and L2, and the two capacitors C1, C2. The switches and the capacitors represent in schematic form sample and hold devices 55. The outputs of switches SW1 and SW2 are applied to analog-to-digital converters 7 and 8, respectively, via lines 5 and 6, respectively. Examples of such analog to digital converters are described in the book entitled "Pulse and Digital Circuits" by J. Millman and H. Taub, published by McGraw Hill, New York, 1956. The converters 7 and 8 are connected to table look-up devices 11 and 12, respectively, via lines 9 and 10. In this example, devices 11 and 12 are read-only memories. The outputs of memories 11 and 12 are applied, via lines 13 and 14, respectively, to the + and − terminals of a binary adder 15. The output of adder 15 is applied via line 16 to a ROM 17 similar to ROM's 11 and 12. The output of ROM 17 is applied via line 18 to a phase correction logic 19. The control logic 19 is also connected to converters 7 and 8 via lines 20 and 21, respectively. Logic 19 generates the output signal of the digital phase detector.

Before describing further the embodiment, it should be recognized that the Hilbert transform gives a convenient approach to quadrature phase shifting. In general, it may be thought of as an operation wherein all frequency components of a given signal are phase shifted by $-\pi/2$ radians. If the phase shift $\Delta\phi = -\pi/2$ then it may be also thought of as a rotating vector of the form $e^{-j\pi/2} = -j$. The frequency transfer function $H(\omega) = -j\ \mathrm{sgn}\ (\omega)$, where sgn is the signum function defined as $$\mathrm{sng}\ (\omega) = \begin{cases} 1 \text{ for } \omega > 0 \\ -1 \text{ for } \omega < 0. \end{cases}$$

If $X(\omega)$ is the input frequency spectrum, then the output is $$H(\omega)\ X(\omega) = -j\ \mathrm{sgn}\ (\omega)\ X(\omega)$$

As pointed out by Voelker in his Pat. No. 3,543,009 from Column 18, line 64 to Column 22, line 72, in describing his transversal filter modified to be a 90° phase shifting Hilbert transformer, "H (Hilbert) transformation is a linear time invariant operation and thus might be performable by a linear network. FIG. 16*a* shows the impulse response which an ideal network would have, and FIG. 16*b* shows the frequency response, i.e., the Fourier transform of the impulse response. Note that FIG. 16*b* requires only a −90° phase shift; thus an H transforming network can be thought of as one which converts "cosine" input waves into "sine output waves—".

Referring again to FIG. 1, the read only memories 11, 12, and 17 may be constructed from either a static or dynamic logic. In static logic, the active semiconductive elements are returned to biasing potentials and each element is dissipating power all of the time whether activated or not. In dynamic logic, a driving device is required to activate the selected elements at periodic times only. This permits capacitors to be used for storage of the read out from the memory. The designer in specifying the technology and the static or dynamic nature of the memories he desires to use must keep in mind the tradeoffs. For example, semiconductor elements are capable of faster switching speeds than magnetic ones. The packing density of semi-conductors such as unipolar or bipolar transistors is far superior than magnetics. Ever as between unipolar and bipolar transistors the designer is advised to consider the fact that field effect transistors illustrative of current unipolar technology has two advantages. First, it possesses a higher packing density over bipolar junction technology and secondly, it utilizes fewer numbers of masks in the fabrication process. Currently available ROM's which may be utilized in this invention have access times in the order of several hundred nano seconds and an information capacity in the order of several thousand words at 16 bits per word. However, because such memory devices are expensive, a second embodiment minimizing the number of ROM's will be described.

In FIG. 1, a clock 53 controls the simultaneous closure, during a very short time interval, of switches SW1 and SW2 at the sampling instants. For the purposes of the digital processing of the signals, the values of signals S and $\bar{S}$ at the sampling instants are stored in capacitors C1 and C2, respectively, and are applied to analog converters 7 and 8, respectively. These converters provide a binary representation of the signals applied thereto. Generally, this binary representation comprises a sign bit and several bits representing the absolute value of the signal amplitude. The number of bits depend essentially upon the degree of accuracy desired for the conversion process. The absolute value $|S|$ is present on line 9 and the sign of S is present on line 20. Similarly, the abosolute value $|\bar{S}|$ and the sign of $\bar{S}$ are available on lines 10 and 21, respectively. Of course, if signals S and $\bar{S}$ are already available in binary form, analog-to-digital converters need not be provided.

In accordance with the foregoing, signals $|S| = |R \sin \theta|$ and $|\bar{S}| = |R \cos \theta|$ are available on lines 9 and 10 respectively.

The value of the phase $\theta$ can be recovered by working out the ratio $|S/\bar{S}| = |\tan \theta|$. However, to eliminate the need for such an operation, ROM's 11 and 12 are designed to supply the values $\ln|S|$ and $\ln|\bar{S}|$, respectively. To this end, signals $|S|$ and $|\bar{S}|$ are used to respectively address ROM's 11 and 12 storing in the locations defined by the signals applied thereto the logarithms of these signals in binary form. As mentioned above, such memories are commerically available, the data being stored therein by the manufacturer as specified by the user.

The sign of S and sign of $\bar{S}$ values are applied via lines 20 and 21, respectively, to the phase correction logic 19. This logic will make corrections taking into account the fact that only the absolute values $|S|$ and $|\bar{S}|$ will subsequently be processed. Restated, the signs of S and of $\bar{S}$ define the quadrant of a unit circle that an acute reference angle $\alpha$ makes with the zero degree axis. The so-called "quadrant adjustment" is processed by correction logic 19.

The outputs of ROM's 11 and 12 are applied to a binary adder 15. The "subtraction" is achieved either by ROM 12 providing a $-\ln|\bar{S}|$ output or the adder is modified to perform "subtraction" per R. K. Richard's "Arithmetic Operations in Digital Computers".

The binary adder 15 performs the operation: Let $L = \ln|S| - \ln|\bar{S}| = \ln|S/\bar{S}| = \ln|\tan\theta|$.

The value of L is then applied to a ROM 17 which converts it into:

$\alpha = \arctan e^{L} = \arctan|\tan\theta|$, since $|\tan\theta = e^{\ln}|\tan\theta = e^{\ln|S|-\ln|\bar{S}|}$.

The value of $\theta$ is derived from that of $\alpha$ by means of simple arithmetic operations, taking into consideration the signs of S and $\bar{S}$ as applied to the phase correction logic 19 via lines 20 and 21, respectively.

Table I below shows the various operations performed by the phase correction control logic 19:

TABLE I

| Sign of S | Sign of $\bar{S}$ | Quadrant | |
|---|---|---|---|
| + | + | 1 | $\theta=\alpha$ |
| + | − | 2 | $\theta=\pi-\alpha$ |
| − | − | 3 | $\theta=\pi+\alpha$ |
| − | + | 4 | $\theta=-\alpha$ |

These various operations will be more readily understood by referring to FIGS. 2A–2D which illustrate the four cases that may occur depending upon the signs of S and $\bar{S}$.

First Quadrant

Figure 2A:
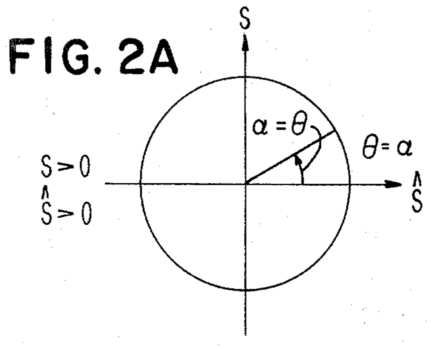
FIGS. 2A – 2D illustrate the phase correction operations which are performed for various values of the phase $\theta$ in accordance with the device of FIG. 1.

If $S > 0$ and $\bar{S} > 0$, then FIG. 2A $|\sin\theta| = \sin\theta$; $|\cos\theta| = \cos\theta$ $$\alpha = \text{arctg}\,|\text{tg}\,\theta| = \text{arctg tg}\,\theta \quad (1)$$

and $$0 < \theta > \pi/2 \quad (2)$$

Figure 2B:
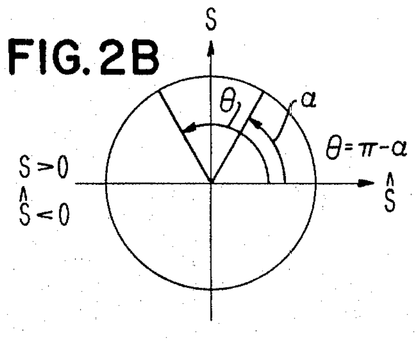

The solution to 1 and 2 is $= \theta = \alpha$. FIG. 2B

Second Quadrant

If $S > 0$ and $\bar{S} < 0$, then $|\sin\theta| = \sin\theta$; $|\cos\theta| = -\cos\theta$ $$\alpha = \text{arctg}\,|\text{tg}\,\theta| = \text{arctg}\,(-\text{tg}\theta) \quad (3)$$

and $$\pi/2 < \theta < \pi \quad (4)$$

The solution to 3 and 4 is $\theta = \pi - \alpha$.

Third Quadrant

Figure 2C:
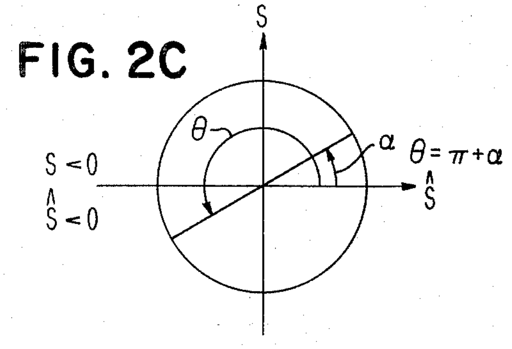

If $S < 0$ and $\bar{S} < 0$, then FIG. 2C $|\sin\theta| = -\sin\theta$; $|\cos\theta| = -\cos\theta$ $$\alpha = \text{arctg}\,|\text{tg}\,\theta| = \text{arctg}\,(\text{tg}\theta) \quad (5)$$

and $$\pi < \theta < 3\pi/2 \quad (6)$$

The solution to 5 and 6 is $\theta = \pi + \alpha$.

Fourth Quadrant

Figure 2D:
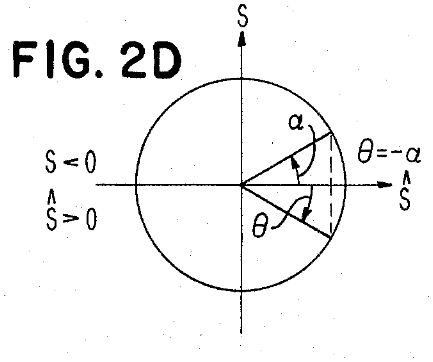

If $S < 0$ and $\bar{S} > 0$, then FIG. 2D $|\sin\theta| = -\sin\theta$; $|\cos\theta| = \cos\theta$ $$\alpha = \text{arctg}\,|\text{tg}\,\theta| = \text{arctg}\,(-\text{tg}\,\theta) \quad (7)$$

and $$3\pi/2 < \theta < 2\pi \quad (8)$$

The solution to 7 and 8 is $\theta = -\alpha$

It should be noted that, in the detector described in relation to FIG. 1, the various ROM's must have a larger number of storage locations since the value of phase $\theta$ as processed can vary from 0° to $\pi$, such value being obtained from $|\sin\theta|$ and $|\cos\theta|$. The detector shown in FIG. 3 makes it possible to reduce the number of storage locations of the various ROM's by using the symmetries that exist in the definitions of the simple trigonometric functions. Further, the detector of FIG. 3 takes advantage of the difference that exists between the frequency of the commonly used sampling instants and the frequency at which existing analog-to-digital converters, binary adders and ROM's can operate.

Figure 3:
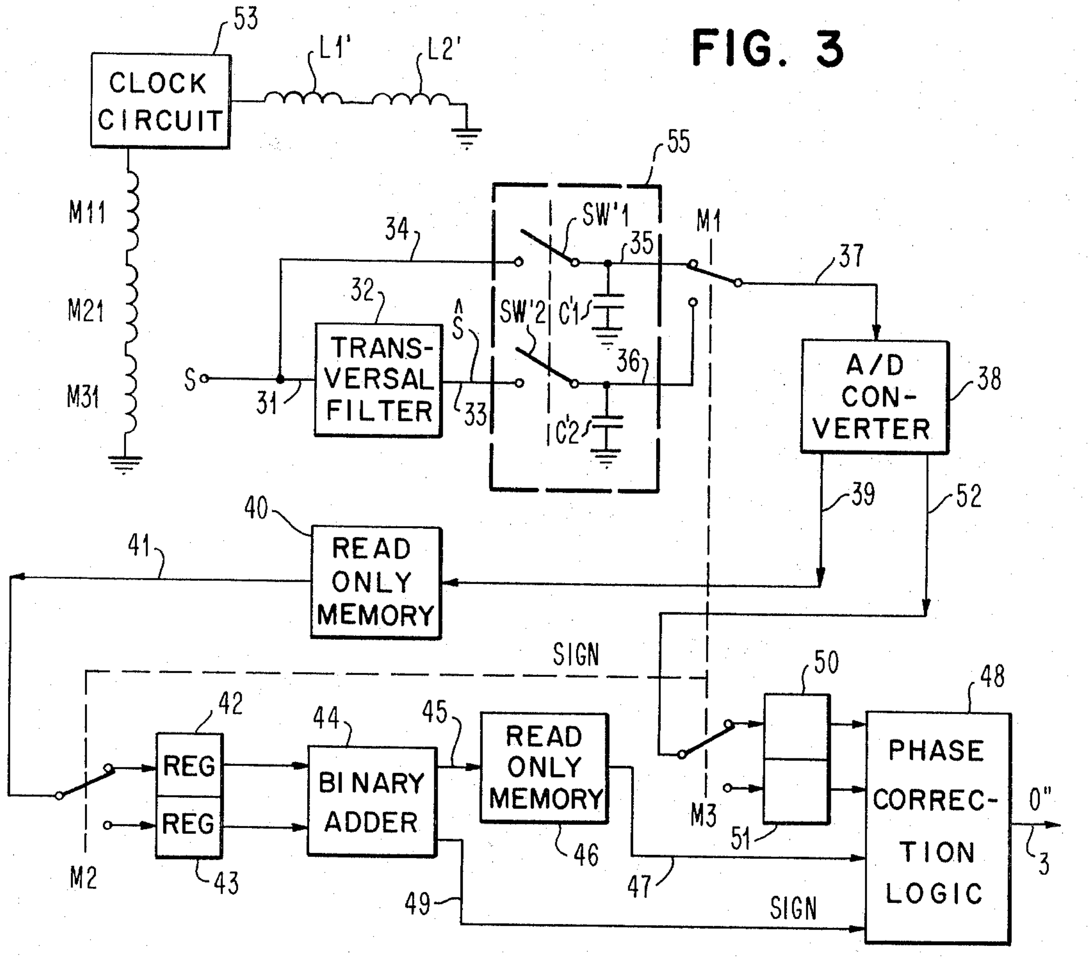
FIG. 3 is a schematic diagram illustrating improvements made in the device of FIG. 1, primarily in the reduction of the amount of read only memory required.

In FIG. 3, the input signal S is applied via line 31 to a device 32 which provides via line 33 the Hilbert transform $\bar{S}$ of signal S, device 32 being similar to device 2 of FIG. 1. The input signal S, transmitted via line 34, and signal $\bar{S}$, transmitted via line 33, are respectively applied to two switches SW'1 and SW'2 whose simultaneous closure is controlled by a clock 53. These switches represent in schematic form two sampling devices. The values assumed by signals S and $\bar{S}$ at the characteristic instants are respectively stored in two capacitors C'1 and C'2, which represent schematically two hold circuits. The signals S and $\bar{S}$ present on lines 35 and 36, respectively, are successively applied to a line 37 and to an analog-to-digital converter 38 through a switch M1. The output of analog-to-digital converter 38 is applied via line 39 to a ROM 40. The ROM 40 output is in turn applied via line 41 to a switch M2. Switch M2 successively connects line 41 to two registers 42 and 43. The register outputs are applied to the + and − input terminals, respectively, of a binary adder 44. One of the outputs of adder 44 is applied via line 45 to a ROM 46. The ROM 46 output is in turn applied via line 47 to one of the inputs of a phase correction logic 48. Another output of adder 44 is applied via line 49 to another input of logic 48, to whose remaining two inputs are applied the contents of two storage devices or latches 50 and 51, to whose inputs are applied, by means of a switch M3, the signals generated by converter 38 over line 52.

Figure 3A:
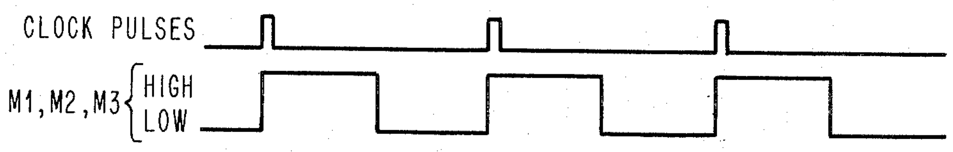
FIG. 3A is a timing diagram intended to facilitate the understanding of the improvements illustrated by FIG. 3.

The operation of the detector of FIG. 3 will now be described, referring also to FIG. 3A. FIG. 3A is a timing diagram showing the pulses generated by the clock 53 to control the simultaneous closure of switches SW'1 and SW'2 and the times during which the three switches M1, M2, M3 of FIG. 3 remain in the upper or in the lower position.

The values of signals S and $\bar{S}$ at the sampling instants are stored in capacitors C'1 and C'2. Because of the speed of currently available circuits, signals S and $\bar{S}$ are successively processed between two sampling instants provided by the clock 53. For example, signal S will be dealt with during the first half T/2 of the sampling period and signal $\bar{S}$ during the second half T/2 of the sampling period. All three switches M1–M3 will simultaneously be either in the upper position (as shown in FIG. 3) or in the lower position, the upper position corresponding, for example, to the processing of signal S and the lower position to that of signal $\bar{S}$.

Converter 38 provides a binary representation of the signals applied thereto. Generally, such binary representation comprises a sign bit and several bits representing the absolute value of the signal amplitude, the number of bits depending essentially upon the degree of accuracy desired for the conversion process. The absolute values $|S|$ and $|\bar{S}|$ will successively be present on line 39 while the sign bits for signals S and $\bar{S}$ will successively be present on line 52.

ROM 40 therefore, provides the values $\ln|S|$ and $\ln|\bar{S}|$, and the sign of S and sign of $\bar{S}$ information will be used by the phase correction logic 48 since only the absolute values of the signals are to be dealt with. Since the values $\ln|S|$ and $\ln|\bar{S}|$ must be simultaneously available to binary adder 44 in order that this adder may subtract $\ln|S|$ from $\ln|\bar{S}|$, both of these values, as successively provided by ROM 40, are stored in registers 42 and 43, respectively, by means of switch M2.

The difference $L = \ln|S| - \ln|\bar{S}|$ can be expressed as:

$$L = \ln|S/\bar{S}| = \ln|\tan\theta|.$$

If $$0 < \theta < \pi/4, L < 0.$$

If $$\pi/4 < \theta < \pi/2, L > 0.$$

In order to reduce the size of ROM 46, it is provided that this memory will only process the absolute value of L, $|L|$, which is present on line 45, the sign of L being present on line 49 and applied to the phase correction logic 48, which will take the sign into consideration.

Since adder 44 will always provide ROM 46 with the positive logarithm of a phase whose value lies between $\pi/4$ and $\pi/2$, that is, for which tg $\theta$ is greater than 1, the actual value of the phase must be determined by means of arithmetic operations described later, taking into consideration the signs of L, S, and $\bar{S}$.

The absolute value $|L|$ is applied via line 45 to ROM 46, which converts $|L|$ into:

$$\theta' = \text{arctg } e^{|L|} - \pi/4 = \text{arctg } |\tan\theta| - \pi/4.$$

The value of $\theta'$ as defined above varies between 0 and $\pi/4$ so as to reduce the size of ROM 46. As a result, ROM 46 will only contain those values of $\theta'$ which lie between 0 and $\pi/4$. The object of this definition of $\theta'$ is to take advantage of the symmetry of the trigonometric lines relative to $\pi/4$.

The value of $\theta$ is derived from that of $\theta'$ by performing simple arithmetic operations, taking into account the sign of L as well as the signs of S and $\bar{S}$ stored in the storage devices or latches 50 and 51, respectively, by means of switch M3.

Since $\theta$ contains an unknown contact ($\phi_0$), i.e., $\theta = \phi_0 + \Delta\phi$, it will be sufficient to obtain $$\theta' = \theta - \pi/4.$$

The various operations performed by the phase correction logic 48 are described in Table II below.

TABLE II

| Sign of S | Sign of $\bar{S}$ | Sign of L | Quadrant | |
|---|---|---|---|---|
| + | + | + | 1 | $\theta''=\theta''$ |
| + | + | − | 1 | $\theta''=-\theta'$ |
| + | − | + | 2 | $\theta''=\pi/2-\theta'$ |
| + | − | − | 2 | $\theta''=\pi/2+\theta'$ |
| − | − | + | 3 | $\theta''=\pi+\theta'$ |
| − | − | − | 3 | $\theta''=\pi-\theta'$ |
| − | + | + | 4 | $\theta''=\pi/2-\theta'$ |
| − | + | − | 4 | $\theta''=\pi/2+\theta'$ |

The above-mentioned operations will be more readily understood by referencing to FIGS. 4A–4D which illustrate the various cases to be considered depending upon the signs of S, S, and 1.

FIG. 4A:

If $S > 0$, $\bar{S} > 0$ and $L > 0$, then $\theta$ lies between $\pi/4$ and $\pi/2$.

Adder 44 supplies $\ln\tan\pi$, and because $\theta' = -\pi/4$, $\theta'' = \theta'$ since, by definition, $\theta'' = \theta - \pi/4$.

If $S > 0$, $\bar{S} > 0$ and $L < 0$, then $\theta$ lies between 0 and $\pi/4$.

Adder 44 supplies $\ln\tan(\pi/2 - \theta)$, and since $\theta' = \pi/2 - \theta - \pi/4$, we have $\theta'' = -\theta'$.

FIG. 4B:

If $S > 0$, $\bar{S} < 0$ and $L > 0$, then $\theta$ lies between $\pi/2$ and $3\pi/4$.

Adder 44 supplies $\ln\tan(\pi - \theta)$, and since $\theta' = \pi - \theta = \pi/4$, $\theta'' = \pi/2 - \theta'$.

If $S > 0$, $\bar{S} < 0$ and $L < 0$, then $\theta$ lies between $3\pi/4$ and $\pi$.

Adder 44 supplies $\ln\tan(\theta - \pi/2)$, and since $\theta' = \theta - \pi/2 - \pi/4$, $\theta'' = \pi/2 + \theta'$.

FIG. 4C:

If $S < 0$, $\bar{S} < 0$ and $L > 0$, then $\theta$lies between $5\pi/4$ and $3\pi/2$.

Adder 44 supplies $\ln\tan(\theta - \pi)$, and since $\theta' = \theta - \pi - \pi/4$, $\theta'' = \pi \times \theta'$.

If $S < 0$, $\bar{S} < 0$ and $L < 0$, then $\theta$ lies between $\pi$ and $5\pi/4$.

Adder 44 supplies $\ln\tan(3\pi/2 - \theta)$, and since $\theta' = 3\pi/2 - \theta - \pi + 4$, $\theta'' = \pi - \theta'$.

Figure 4A:
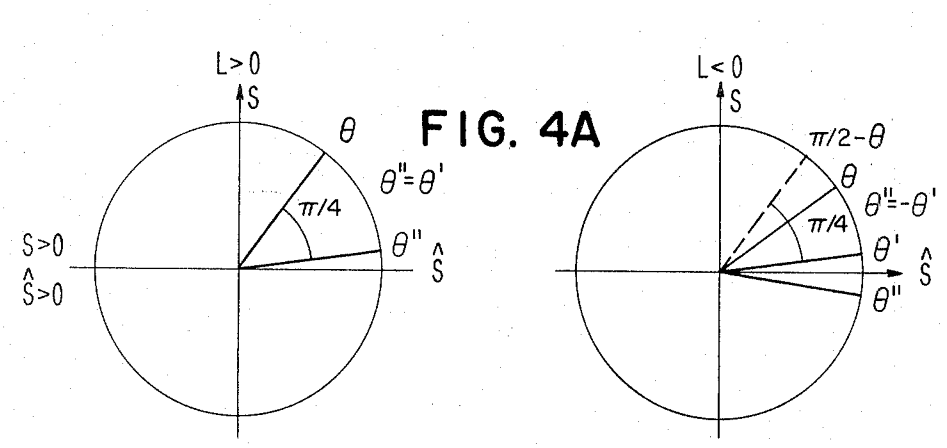
FIGS. 4A–4D illustrate the phase correction operations performed for various values of $\theta$ in accordance with the device of FIG. 3.
Figure 4B:
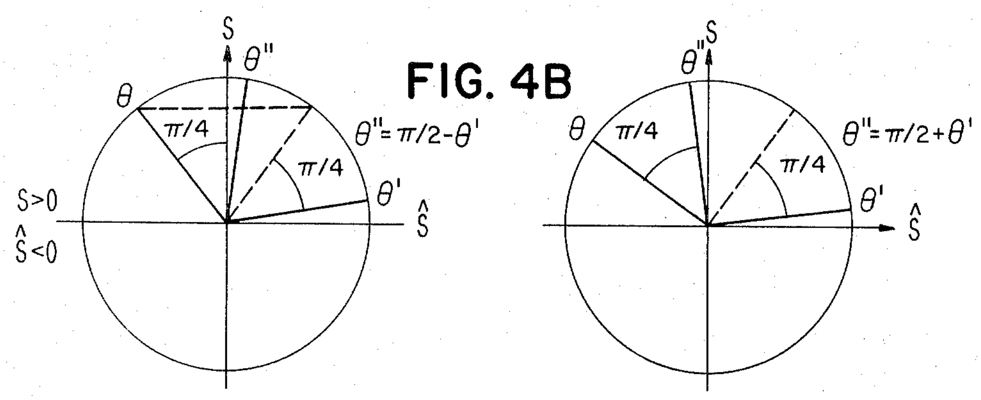
Figure 4C:
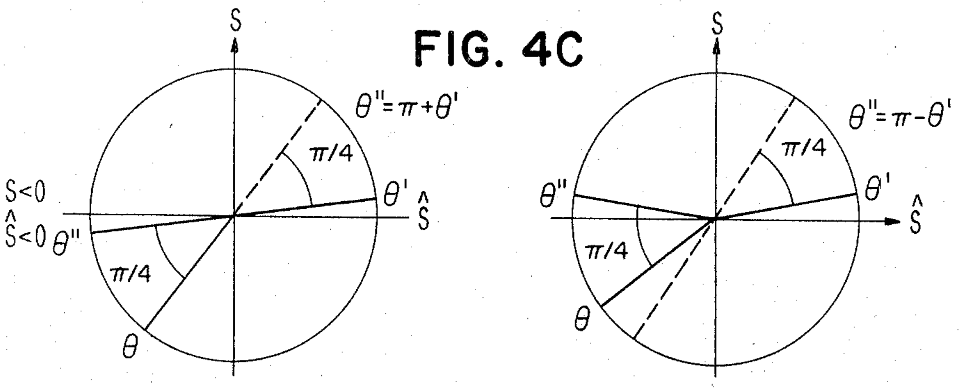
Figure 4D:
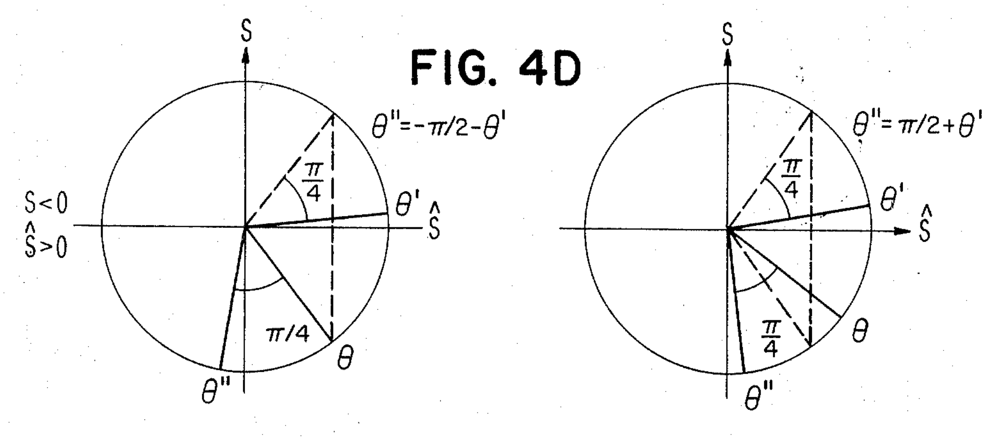

FIG. 4D (fourth quadrant):

If $S < 0$, $\bar{S} > 0$, and $L < 0$, then $\theta$ lies between $3\pi/2$ and $7\pi/4$.

Adder 44 supplies $\ln\tan(-\theta)$, and since $\theta' = -\theta - \pi/4$, $\theta'' = -\pi/2 - \theta'$.

If $S < 0$, $\bar{S} > 0$ and $L < 0$, then $\theta$ lies between $7\pi/4$ and $2\pi$.

Adder 44 supplies $\ln\tan(\pi/2 - \theta)$, and since $\theta' = \pi/2 + \phi - \pi/4$, $\theta'' = -\pi/2 + \theta'$.

To simplify these operations, the various values of $\theta$, $\theta'$ and $\theta''$ have been coded in fractions of $2\pi$.

The interior design of the phase correction logic 19 and 48 is believed to be well within the capabilities of the skilled designer. In this regard, reference is made to two now classic works in this field, namely, R. K. Richards, "Arithmetic Operations in Digital Computers", D. VanNostrand Company, Inc., New York, 1955, Chapter 3, and Montgomery Phister, "Logical Design of Digital Computers", John Wiley & Sons, New York, 1958, Chapters 5 and 6 for the detailed design procedures. Parenthetically, Tables 1 and 2 also define a Read Only Memory which may be substituted for the correction logic.

Such a phase detector therefore permits to discriminate between the various phases with no zero crossing detection or time measurements being required, thereby eliminating the need for using highly accurate devices. The number of phases that can be discriminated between is solely dependent upon the number of memory locations of the various ROM's, which makes it possible to discriminate between a considerable number of phases. The phase detector also provides an absolute measurement of the phase of the input signal, which measurement can be used to recover the data from the signals modulated in accordance with the coherent or differential phase modulation techniques.

It should be understood that, although the various lines interconnecting the digital units such as the ROM's are represented in the Figures by a single line, this is not intended as a limitation of the invention and that the principles thereof are equally applicable to units providing data in parallel form.

While the invention has been particularly shown and described with reference to preferred embodiments thereof, it will be understood by those skilled in the art that various changes in form and detail may be made therein without departing from the spirit and scope of the invention.

What is claimed is:

1. A digital phase detector comprising:

means responsive to an applied sinusoid $S = R \text{ Sin } \theta$ for forming a quadrature signal $\bar{S} = R \text{ Cos } \theta$;

means for periodically sampling and for digitally sign and magnitude encoding the samples;

means responsive to the encoded magnitudes $|S|$ and $|\bar{S}|$ for forming the difference signal $L = \ln|S| - \ln|\bar{S}|$;

means for forming a signal $\alpha$ representative of an acute reference angle on a unit circle according to the relation $\alpha = \tan^{-1}|e^L|$; and means for adjusting the phase angle $\theta$ as a function of the match or mismatch of the signs of S and $\bar{S}$ defining the quadrant on a unit circle and the value of $\alpha$.

2. A digital phase detector according to claim 1, wherein the means for adjusting the phase angle $\theta$ modifies said angle according to the following table:

| Sign of S | Sign of $\bar{S}$ | $\theta$ |
|---|---|---|
| + | + | $\theta=\alpha$ |
| + | − | $\theta=\pi-\alpha$ |
| − | − | $\theta=\pi+\alpha$ |
| − | + | $\theta=-\alpha$ |

3. In a digital phase detector in which an applied sinusoid $S = R \text{ Sin } \theta$ and its derived quadrature signal $\bar{S} = R \text{ Cos } \theta$ are sampled and digitally sign and magnitude encoded, the combination comprising:

first table look-up means responsive to the encoded signals at the addresses $|S|$ and $|\bar{S}|$ for producing the signals ln S and ln S;

binary adding means for forming a difference signal $\ln|S| - \ln|\bar{S}|$;

second table look-up means responsive to the address represented by the difference signal for producing a signal $\alpha$ equivalent of an acute reference angle on a unit circle, the angle $\alpha$ being related to the difference signal as $\alpha = \tan^{-1} e^{\ln}|S| - \ln|\bar{S}|$; and a logic arrangement for ascertaining the unit circle quadrant of the phase angle $\theta$ as a function of the similarity or difference in the sign of S and $\bar{S}$ such that for matching positive signs $\theta = \alpha$, for matching negative signs $\theta = \pi + \alpha$, for a positive sign of S and a negative sign of $\bar{S}$, $\theta = \pi - \alpha$, and for a negative sign of S and a positive sign of $\bar{S}$, $= -\alpha$.

4. In a digital phase detector in which an applied sinusoid $S = R \text{ Sin } \theta''$ and its derived quadrature signal $\bar{S} = R \text{ Cos } \theta''$ are sampled and digitally sign and magnitude encoded, the combination comprising:

first table look-up means responsive to the addresses represented by $|S|$ and $|\bar{S}|$ for providing the signals $\ln|S|$ and $\ln|\bar{S}|$;

binary adding means for forming the absolute difference signal $|L| = |\ln|S| - \ln|\bar{S}||$ and a sign signal;

second table look-up means responsive to the addresses represented by $|L|$ for providing a signal equivalent to an acute angle $\theta'$ on a unit circle in the range $0 < \theta' < \pi/4$ according to the relation $\theta' = \tan^{-1} e^{|L|} - \pi/4$; and a logic arrangement for adjusting the phase angle $\theta''$ by ascertaining the equivalent unit circle quadrant as a function of the similarity or difference among the signs of S, S, and L, and algebraically combining the acute angle $\theta'$ with a specified constant.

* * * * *